US012547879B2

(12) United States Patent
Lomuscio et al.

(10) Patent No.: US 12,547,879 B2
(45) Date of Patent: Feb. 10, 2026

(54) VERIFICATION OF PERCEPTION SYSTEMS

(71) Applicant: IMPERIAL COLLEGE OF SCIENCE, TECHNOLOGY AND MEDICINE, London (GB)

(72) Inventors: Alessio Lomuscio, London (GB); Panagiotis Kouvaros, London (GB)

(73) Assignee: Imperial College Innovations Limited, London (GB)

(*) Notice: Subject to any disclaimer, the term of this patent is extended or adjusted under 35 U.S.C. 154(b) by 1106 days.

(21) Appl. No.: 17/295,752

(22) PCT Filed: Nov. 26, 2019

(86) PCT No.: PCT/GB2019/053335
§ 371 (c)(1),
(2) Date: May 20, 2021

(87) PCT Pub. No.: WO2020/109774
PCT Pub. Date: Jun. 4, 2020

(65) Prior Publication Data
US 2022/0019879 A1    Jan. 20, 2022

(30) Foreign Application Priority Data
Nov. 26, 2018 (GB) .................................... 1819211

(51) Int. Cl.
*G06N 3/048* (2023.01)
*G06F 18/214* (2023.01)
(Continued)

(52) U.S. Cl.
CPC ......... *G06N 3/048* (2023.01); *G06F 18/2148* (2023.01); *G06F 18/2431* (2023.01); *G06N 3/08* (2013.01)

(58) Field of Classification Search
CPC ...... G06N 3/08; G06N 3/048; G06F 18/2148; G06F 18/2431
See application file for complete search history.

(56) References Cited

U.S. PATENT DOCUMENTS 6,401,082 B1    6/2002  Kropas-Hughes et al.
9,830,534 B1 *  11/2017 Ravichandran ......... G06F 18/24
(Continued)

OTHER PUBLICATIONS

J. Sokolić, R. Giryes, G. Sapiro and M. R. D. Rodrigues, "Robust Large Margin Deep Neural Networks," in IEEE Transactions on Signal Processing, vol. 65, No. 16, pp. 4265-4280, Aug. 15, 2015, 2017, doi: 10.1109/TSP.2017.2708039 (Year: 2017).*
(Continued)

*Primary Examiner* — Kamran Afshar
*Assistant Examiner* — Simon Fischer Ellis
(74) *Attorney, Agent, or Firm* — Harness, Dickey & Pierce, P.L.C.

(57) ABSTRACT

There is provided a computer-implemented method for verifying the robustness of a neural network classifier with respect to one or more parameterised transformations applied to an input, the classifier comprising one or more convolutional layers, the method comprising: encoding each layer of the classifier as one or more algebraic classifier constraints; encoding each transformation as one or more algebraic transformation constraints; encoding a change in an output classifier label from the classifier as an algebraic output constraint; determining whether a solution exists which satisfies the classifier constraints, transformation constraints and output constraints, and determining the classifier as robust to the local transformations if no such solution exists. A perception system and a computer readable medium are also provided.

9 Claims, 6 Drawing Sheets

(51) Int. Cl.
  *G06F 18/2431* (2023.01)
  *G06N 3/08* (2023.01)

(56) References Cited

U.S. PATENT DOCUMENTS

2013/0089304 A1* 4/2013 Jiang ............... G06V 20/41
                                                386/285
2017/0039445 A1* 2/2017 Tredoux ............ H04N 23/6811
2018/0144746 A1* 5/2018 Mishra ............. G06V 40/172

OTHER PUBLICATIONS

Kanbak, Can. "Measuring robustness of classifiers to geometric transformations." (2017) (Year: 2017).*
Tsui-Wei Weng et al: "Evaluating the Robustness of Neural Networks: An Extreme Value Theory Approach" Jan. 31, 2018.
Fawzi Alhussein et al: "Analysis of classifiers' robustness to adversarial perturbations", Machine Learning, Kluwer Academic Publishers, Boston, US, vol. 107, No. 3, Aug. 25, 2017.
Bose Avishek Joey et al: "Adversarial Attacks on Face Detectors Using Neural Net Based Constrained Optimization", 2018 IEEE 20th International Workshop on Multimedia Signal Processing (MMSP), IEEE, Aug. 29, 2018.

* cited by examiner

FIG. 5

| Trans. | Domain | Acc. (%) | Iteration 1 | | | Iteration 2 | | | Iteration 3 | | |
|---|---|---|---|---|---|---|---|---|---|---|---|
| | | | Label (%) | Acc. (%) / Time (s) STD | Acc. (%) / Time (s) VENUS | Label (%) | Acc. (%) / Time (s) STD | Acc. (%) / Time (s) VENUS | Label (%) | Acc. (%) / Time (s) STD | Acc. (%) / Time (s) VENUS |
| Translation (x) | [-2,2] | 53 | 16 | 64 (0) | 65 (161) | 27 | 65 (0) | 77 (167) | 36 | 77 (0) | 78 (161) |
| Scale | [0.5, 1.5] | 12 | 2 | 33 (0) | 24 (289) | 3 | 29 (0) | 44 (291) | 5 | 31 (0) | 45 (27) |
| Shear (x) | [-0.1, 0.2] | 72 | 11 | 83 (0) | 81 (323) | 19 | 82 (0) | 83 (346) | 25 | 83 (0) | 86 (343) |
| Rotation | [-20, 20] | 7 | 0.5 | 18 (0) | 19 (405) | 1 | 19 | 19 (418) | 2 | 17 | 23 (415) |
| Brightness | [-0.5, 0.5] | 75 | 0.5 | 76 (0) | 83 (15) | 1 | 92 (0) | 90 (12) | 1 | 93 | 95 (7) |
| Contrast | [0.5, 1.5] | 95 | 0.40 | 96 (0) | 96 (2) | 0.86 | 96 (0) | 96 (3) | 1 | 95 (0) | 96 (2) |

FIG. 6

VERIFICATION OF PERCEPTION SYSTEMS

FIELD

The present disclosure relates to verifying the behaviour of classifiers. In particular, but not exclusively, the present disclosure relates to verification of the robustness of a trained convolutional neural network to transformations of its input, and improving such robustness. The disclosure also identifies an enhanced method to perform learning on the basis of the counterexamples found during verification.

BACKGROUND

Autonomous systems are forecasted to revolutionise key aspects of modern life including mobility, logistics, and beyond. While considerable progress has been made on the underlying technology, severe concerns remain about the safety of the autonomous systems under development.

One of the difficulties with forthcoming autonomous systems is that they incorporate complex components that are not programmed by engineers but are synthesised from data via machine learning methods, such as a convolutional neural network. Convolutional neural networks have been shown to be particularly sensitive to variations in their input. At the same time, there is an increasing trend to deploy autonomous systems comprising convolutional neural networks in safety-critical areas, such as autonomous vehicles. These two aspects taken together call for the development of rigorous methods for the formal verification of autonomous systems based on learning-enabled components.

At the moment, no existing technique can provide formal guarantees about the robustness of a convolutional neural network to those transformations of its input that are to be expected in its deployment. There is therefore no effective means of providing formal assurances on the real-world behaviour of autonomous systems in which the output of a convolutional neural network is used to inform decision-making.

SUMMARY

According to a first aspect, there is provided a computer-implemented method for verifying robustness of a neural network classifier with respect to one or more parameterised transformations applied to an input the classifier comprising one or more convolutional layers.

The method comprises: encoding each layer of the classifier as one or more algebraic classifier constraints; encoding each transformation as one or more algebraic transformation constraints; encoding a change in an output classifier label from the classifier as an algebraic output constraint; determining whether a solution exists which satisfies the constraints above; =and determining the classifier as robust to the transformations if no such solution exists.

In this way, a trained neural network classifier may be assessed as to whether there exist any potential parameters for a given set of transformations that would cause a change in classifier output. If so, the classifier can be understood to lack robustness to that transformation. Verifying that a classifier meets such a robustness criteria can be important, particularly in safety critical implementations.

For example, the classifier may be configured to classify sensor data such as image data and/or audio data (for example, the classifier may be an image classifier and/or an audio classifier). The classifier may operate as part of a perception system configured to take one or more actions in dependence on the output of the classifier. The perception system may comprise, for example, the classifier and a controller, wherein the control element is configured to output one or more control signals in dependence on the output of the classifier. The perception system may further comprise an actuator configured to operate in accordance with control signals received from the controller. In such circumstances, the reliability of these actions may be compromised when the perception input is misclassified.

When a solution exists to the constraint problem above identified on the classifier, transformations and output constraints, the method may identify the parameters of the one or more transformations associated with the solution. This enables the construction of a counterexample to the classifier which can be used as evidence in safety-critical analysis. Furthermore it can be used to augment the dataset and retrain the classifier to improve the robustness of the classifier.

In some embodiments, generating the additional training data may comprise applying the one or more transformations to existing training data using the identified parameters.

Optionally, one or more of the classifier constraints the transformation constraints and output constraints are linear constraints. All constraints may be linear. Moreover, the constraints may comprise of equality and/or inequality constraints.

At least one or more of the transformations may be a geometric transformations, such as translation, rotation, scaling, shear. The transformations may additionally or alternatively comprise photometric transformations, such as brightness and contrast changes The transformations may be local transformations; for example the transformations may be element-wise transformations.

Optionally, the classifier may comprise one or more fully connected as well as convolutional layers. The fully connected layers and/or the convolutional layers may comprise rectified linear unit (ReLU) activation functions. The convolutional layers may comprise a pooling function such as a max-pooling function.

Optionally, encoding each layer of the classifier as one or more algebraic classifier constraints comprises deriving a mixed-integer linear programming expression for each layer. Indeed, the classifier, transformation and output constraints may all be expressed as a mixed-integer linear programming expression. The skilled person will recognise that solvers are available for such expressions that can efficiently determine whether a solution exists. Other linear inequality and equality constraint representations may be adopted where appropriate.

Optionally, the method may further comprise encoding one or more pixel perturbation constraints and determining whether the solution exists may comprise determining whether the solution meets the perturbations constraints as well as other constraints identified above.

According to a further aspect, there may be provided a computer program product comprising computer executable instructions which, when executed by one or more processors, cause the one or more processors to carry out the method of the first aspect. There may also be provided an implementation comprising one or more processors configured to carry out the learning method of the first aspect.

BRIEF DESCRIPTION OF THE FIGURES

Preferred embodiments of the present disclosure are described below with reference to the accompanying drawings, in which:

FIG. 5 shows experimental results demonstrating the efficacy of the proposed method; and FIG. 6 illustrates further results demonstrating the efficacy of the proposed method.

DETAILED DESCRIPTION

Figure 1:
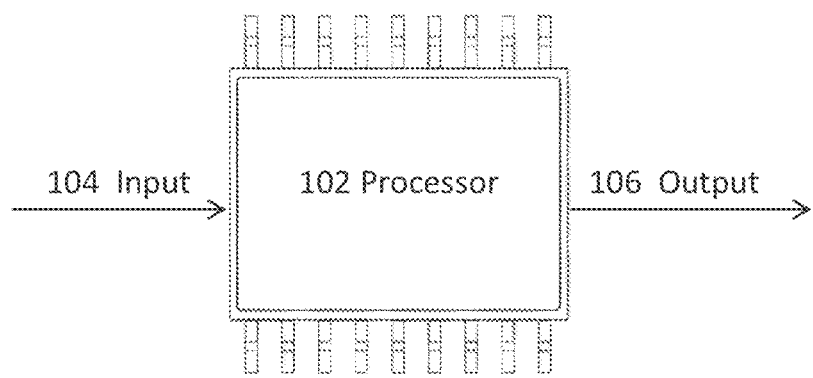
FIG. 1 illustrates an example system capable of formally verifying the robustness of a trained convolutional neural network to transformations of its input.

FIG. 1 illustrates an example system capable of formally verifying the robustness of a trained convolutional neural network to transformations of its input. Such a system comprises at least one processor 102, which may receive data from at least one input 104 and provide data to at least one output 106.

The concepts of a convolutional neural network, a transformation, and local transformational robustness are now described with reference to FIGS. 2 and 3.

Figure 2:
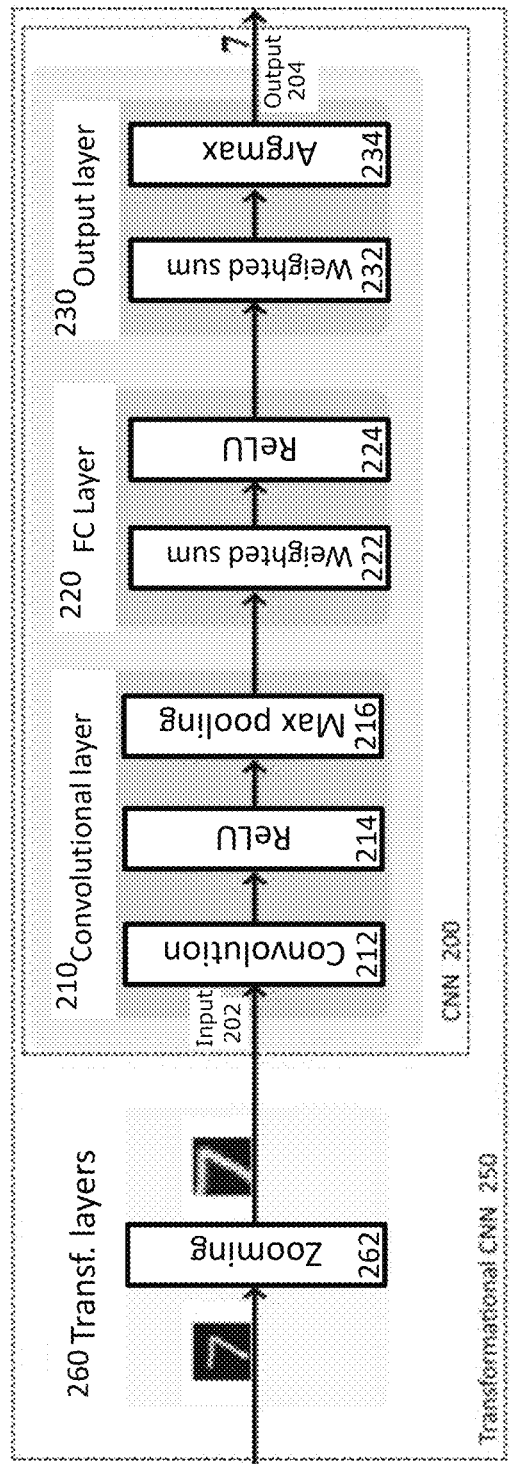
FIG. 2 illustrates a convolutional neural network.

With reference to FIG. 2, a convolutional neural network (CNN) 200 is a directed acyclic graph structured in layers 210-230, such that each node of the graph belongs to exactly one layer. The first layer is said to be the input layer (not shown), the last layer is referred to as the output layer 230, and every layer in between is called a hidden layer.

The CNN takes in data as input 202 such as an image or an audio signal, and outputs a label 204 that can take one of a plurality of possible output classes.

The nodes in the input layer of the CNN reflect the input to the CNN. In all layers except the input layer, each node is connected to one or more nodes of the preceding layer, where each connection is associated with one or more weights.

Every layer in the CNN apart from the input layer is either a fully-connected layer 220 or a convolutional layer 210.

In a fully connected layer 220, each node is connected to every node in the preceding layer, and operates as follows. First, each node calculates the weighted sum 222 of its inputs according to the connection weights, to obtain a linear activation. Second, each node applies a non-linear activation function 224 to the linear activation to obtain its output. Typically, the non-linear activation function 224 is the Rectified Linear Unit (ReLU) whose output is the maximum between o and the linear activation, but may alternatively be any non-linear function, such as a logistic function, a tanh function, or a different piecewise-linear function. Where the activation function 224 is a piecewise-linear function, the function implemented by the layer may be readily expressed as a set of linear equality and inequality constraints.

In a convolutional layer 210, each node is connected to a rectangular neighbourhood of nodes in the preceding layer, and operates as follows. First, each node calculates one or more weighted sums of its inputs 212 according to the connection weights, to obtain one or more linear activations. Second, each node applies a non-linear activation function 214 to each of the one or more linear activations to obtain one or more activations. Typically, the non-linear activation function 214 is a ReLU, but may alternatively be any non-linear function, such as a logistic function or a different piecewise-linear function. Third, each node applies a pooling function 216 to the activations, collapsing the activations into a representative activation, which is the node's output. Typically, the pooling function 216 is the max-pooling function, which sets the representative activation to the maximum of the one or more activations, but could alternatively be another function such as the weighted sum of the one or more activations. Where the non-linear activation function 214 and the pooling function 216 are piecewise-linear functions, the function implemented by the layer may be readily expressed as a set of linear equality and inequality constraints.

The output layer 230 is a fully connected layer 220 that comprises precisely one node for each output class and whose activation function 234 outputs a label corresponding to the node with the largest linear activation.

In general, a CNN is adapted to solving the task of inferring a class from an input. Typically, a CNN may be used to solve an image classification task, where the input 202 is an image $\Im$ from an unknown distribution $R^{\alpha \cdot \beta \cdot \gamma}$ (where $\alpha \cdot \beta$ are the pixels of the image and $\gamma$ is the number of the colour bands, e.g. RGB). The task then concerns the approximation of an unspecified function $f^*$: $R^{\alpha \cdot \beta \cdot \gamma} \to \{[1, \ldots, c]\}$ that takes as input the image $\Im$ and determines among a set of classes $\{[1, \ldots, c]\}$ the class to which $\Im$ is a member. In another example, a CNN may be used to recognise a phoneme from an input representing an audio signal.

The task is solved by training a CNN by means of a training set comprising a plurality of training examples, each of which comprises an input 202 and its associated class. Training the CNN means setting the weights of the network so that its output 204 approximates $f^*$. Following this, the CNN can be used to infer the class 204 for a new input 202 by feeding the new input 202 to the input layer and then propagating it through the network.

To fix the notation, the set $\{[1, \ldots, n]\}$ is denoted by $[n]$, and $\{[n_1, \ldots, n_2]\}$ by $[n_1, n_2]$. A CNN CNN with a set of $[n]$ layers is considered. The nodes in a convolutional layer are arranged into a three-dimensional array; interchangeably, this arrangement may be treated as reshaped into a vector. The nodes in a fully connected layer are arranged into a vector. The output of the (j, k, r)-th (j-th, respectively) node in a convolutional (fully connected, respectively) layer i is represented by $x_{j,k,r}^{(i)}$ ($x_j^{(i)}$ respectively). The vector of all the nodes' outputs in layer i is denoted $\bar{x}^{(i)}$. The size of layer i is denoted $s^{(i)}$, and the size of the i-th dimension of convolutional layer i is denoted $s_j^{(i)}$. Every layer $2 \leq i \leq n$ is a function $f^{(i)}: R^{s^{(i-1)}} \to R^{s^{(i)}}$.

If layer i is a fully-connected layer 220, the function $f^{(i)}$ is defined as follows. The layer is associated with a weight matrix $W^{(i)} \in R^{s^{(i-1)} \cdot s^{(i)}}$ and a bias vector $\bar{b}^{(i)} \in R^{s^{(i)}}$. The linear activation of the layer is given by the weighted sum WS($\bar{x}^{(i-1)}) = W^i \cdot \bar{x}^{(i-1)} + \bar{b}^{(i-1)}$. The function computed by the layer can then be defined as $f^i(\bar{x}^{(i-1)}) = \Box(WS(\bar{x}^{(i-1)}))$, where $\Box \in \{$ [ReLU,Argmax]$\}$ with the function ReLU(x)=max(0,x) being applied element-wise to the linear activation.

If layer i is a convolutional layer 210, the function $f^{(i)}$ is defined as follows. The layer is associated with a group $Conv^{(i),1} \ldots Conv^{(i),k}$ of $k \geq 1$ convolutions and a max-pooling function $Pool^{(i)}$. Each convolution $Conv^{(i),j}$: $R^{s^{(i-1)}} \to R^{(s_1^{i-1}-p+1) \cdot (s_2^{i-1}-q+1)}$ is parameterised over a weight matrix (kernel) $K^{(i),j} \in R^{p \cdot q \cdot s_3^{(i)}}$, where $p \leq s_1^{i-1}$ and $q \leq s_2^{j-1}$ and a bias vector $\bar{b}_j^{(i)}$. The (u,v)-st output of the j-st convolution is given by $$Conv_{u,v}^{(i),j}(\bar{x}^{(i-1)}) = K^{(i),j} \cdot \bar{x}^{(i-1)}_{[u,u'],[v,v'],z_3^{(i-1)}} + \bar{b}_j^{(i)},$$

where u'=u+p−1 and v'=v+q−1. Given the outputs of each of the convolutions, the linear activation of the layer $\text{Conv}^{(i)}$: $R^{s^{(i-1)}} \rightarrow R^{(s_1^{i-1}-p+1) \cdot (s_2^{i-1}-q+1)}$ forms a three-dimensional matrix, i.e. $\text{Conv}^{(i)} = [\text{Conv}_1^{(i)} \ldots \text{Conv}_k^{(i)}]$. The non-linear activation of the layer is then computed by the application of the ReLU function. Finally, the max-pooling function collapses neighbourhoods of size p'·q' of the latter activations to their maximum values. Formally, $$\text{Pool}^{(i)} : R^{u \cdot v \cdot r} \rightarrow R^{\frac{u}{p'} \cdot \frac{v}{q'} \cdot r},$$

where $u = (s_1^{i-1} - p + 1)$ and $v = (s_2^{i-1} - q + 1)$ is defined as follows: $\text{Pool}_{u,v,r}^{(i)} = \max(\text{Conv}_{[(u-1)p+1, u \cdot p], [(v-1)q+1, v \cdot q], r}^{(i)})$. The function computed by the layer is then defined by $f^i(\bar{x}^{(i-1)}) = \text{Pool}^{(i)}(\text{ReLU}(\text{Conv}^{(i)}(\bar{x}^{(i-1)})))$. Given the above, a convolutional neural network 200 CNN: $R^{\alpha \cdot \beta \cdot \gamma} \rightarrow [c]$ can be defined as the composition of fully connected layers 220 and convolutional layers 210

$$\text{CNN}(\bar{x}) = f^{(n)}(f^{(n-1)}(\ldots f^{(1)}(\bar{x}) \ldots))$$

Where $\bar{x} \in R^{\alpha \cdot \beta \cdot \gamma}$, $f^{(1)} \ldots f^{(n-1)}$ are ReLU fully connected or convolutional layers, $f^{(n)}$ is an Argmax fully connected layer, and [c] is a set of class labels.

A transformation is a parametrised function t that transforms a possible input to the CNN into another input according to a predetermined rule. The parameters of the transformation are named degrees of freedom and denoted by the tuple dof(t). For example, if t is a translation that shifts an image by t_x pixels in the horizontal direction and t_y pixels in the vertical direction, then dof(t)=(t_x, t_y). The set of possible values for the degrees of freedom is called the domain $D \subseteq R^{|dof(t)|}$ of the transformation. The domain D may be a strict subset of $R^{|dof(t)|}$, if it is desired to restrict the transformation to certain parameter values only. For example, it may only be necessary to ascertain that a CNN used to classify images is robust to certain small translations rather than all translations. Given $d \in D$, we denote by t[d] the concretisation of t whereby every parameter $\text{dof}(t)_i$ is set to $d_i$.

Typically, the domain D will be a linearly definable set, that is, that it is definable by linear equality and/or inequality constraints. For example, a simple range of values is a linearly definable set. If D is not linearly definable, it may be approximated to arbitrary precision by a linearly definable set.

Given an input, a transformation concisely describes the set of transformed inputs obtained by applying the transformation to the input. This set of transformed inputs may contain an extremely large number of elements, such that it may be computationally infeasible for them all to be explicitly constructed; however, this set is completely and concisely expressed by the input, the form of the transformation, and its domain.

An instance of transformation on an image is an affine transformation, which transforms the pixel at location (x,y) of the original image into the pixel at location (x',y') of the transformed image according to the following formula:

$$(x', y', 1) = \begin{bmatrix} a_{11} & a_{12} & t_x \\ a_{21} & a_{22} & t_y \\ 0 & 0 & 1 \end{bmatrix} \begin{pmatrix} x \\ y \\ 1 \end{pmatrix}$$

Where $$A = \begin{bmatrix} a_{11} & a_{12} \\ a_{21} & a_{22} \end{bmatrix}$$

is a non-singular matrix, and $\bar{t} = (t_x, t_y)^T$ is a translation vector.

An affine transformation whereby A equals the identity matrix is said to be a translation. An affine transformation is referred to as scaling if $A = \sigma I$, $t_x = 0$ and $t_y = 0$ for a scale factor $\sigma$. In the case where $\sigma < 1$, the scaling is called subsampling, whereas in the case where $\sigma > 1$ the scaling is known as zooming.

Another instance of transformation on an image is a photometric transformation, which is an affine change in the intensity of the pixels, applied identically to all the pixels in an image. It is defined as $(p) = \mu p + v$. If $0 < \mu < 1$, then the transformation reduces the contrast of the image. Otherwise, if $\mu > 1$, the transformation increases the contrast of the image. The factor v controls the luminosity of the image with higher values pertaining to brighter images.

Figure 3:
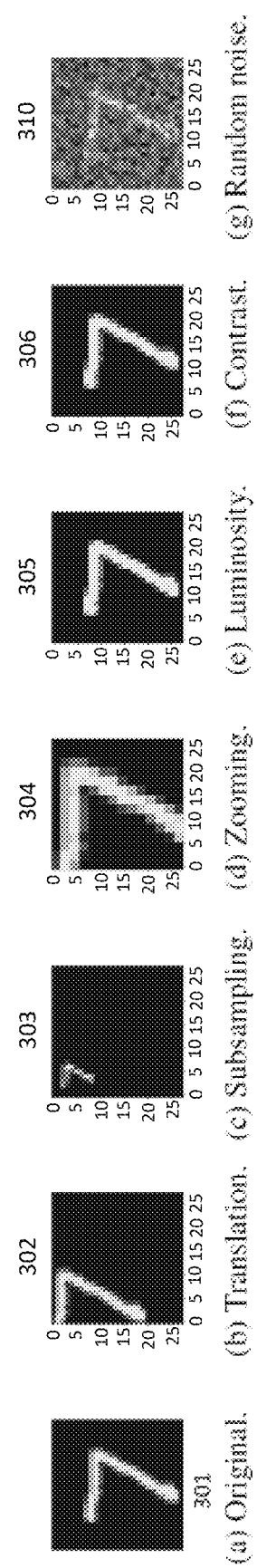
FIG. 3 illustrates the effect of various transformations.

FIG. 3 demonstrates instances of transformations that may be applied to an original image 301. The images 302-304 are each obtained by applying an affine transformation: a translation, a subsampling, and a zooming, respectively. The images 305 and 306 are each obtained by applying a photometric transformation: a brightness change and a contrast change, respectively. The random noise transformation of image 310 may represent a further parameterised transformation. It is understood that each of these example images are obtained at specific values of the degrees of freedom of the transformation; however, the transformations themselves may be defined over non-singular domains.

The examples of FIG. 3 illustrate the limitations associated with some earlier techniques for analysing the performance of CNN classifiers. In particular, some earlier techniques check whether, given an image $\Im$, all images $\Im'$ with $\|\Im' - \Im\| \leq \delta$, for some $L_p$-norm, are classified as belonging to the same class as $\Im$. This technique does not adequately reflect the nature of the potential variations in the sensor data input to perception systems. For example, with reference to FIG. 3, the $L_\infty$-norm between the original image 301 and the brightened image 305 is ~17.16, whereas the distance between the original image 301 and the image composed with random noise 310 is ~16.02. However, it is intuitively clear that the brightened image should be classified as the original one whereas the classification of the noisy one is not as clear. This disconnect between the perceived similarity of images as perceived by a human and the similarity as measured by the u-norm indicates the limitations of approach based on such measures.

Where the output of the CNN is used to drive decisions, it is often a requirement that the CNN be robust to particular transformations of its input. This requirement may be formalised as the notion of local transformational robustness, described as follows. Given a transformation t with domain $D \subseteq R^{|dof(t)|}$, a convolutional neural network CNN is said to be locally transformationally robust (LTR) for an image $\Im$ and the transformation t, if for all $d \in D$ we have that $\text{CNN}(t[d](\Im)) = \text{CNN}(\Im)$.

The particular transformations are typically chosen to reflect transformations of the input that are expected to occur in a practical deployment. Evaluating the robustness of the CNN to those transformations allows the suitability of the CNN for the practical deployment to be ascertained.

For example, the CNN may be an image classifier, which takes an image as input and outputs a class label. This CNN may be used in a practical deployment where it needs to always return the same label for an image of a given visual scene, regardless of the wavelength sensitivity of the camera, the angle and position of the camera, the camera's resolution, or the distance between the camera and the scene. This requirement may then be expressed in terms of robustness to certain transformations, such as affine and photometric transformations. Establishing that the CNN is LTR to those transformations therefore provides assurance that it will function robustly in its practical deployment.

In another example, the CNN may be a speech recognition classifier, which takes an audio signal as input and outputs a phoneme. In this case, establishing that the CNN is LTR to certain frequency-dependent transformations could validate that the CNN will always return the same label for an audio signal of a given utterance, regardless of the frequency response of the microphone.

Figure 4:
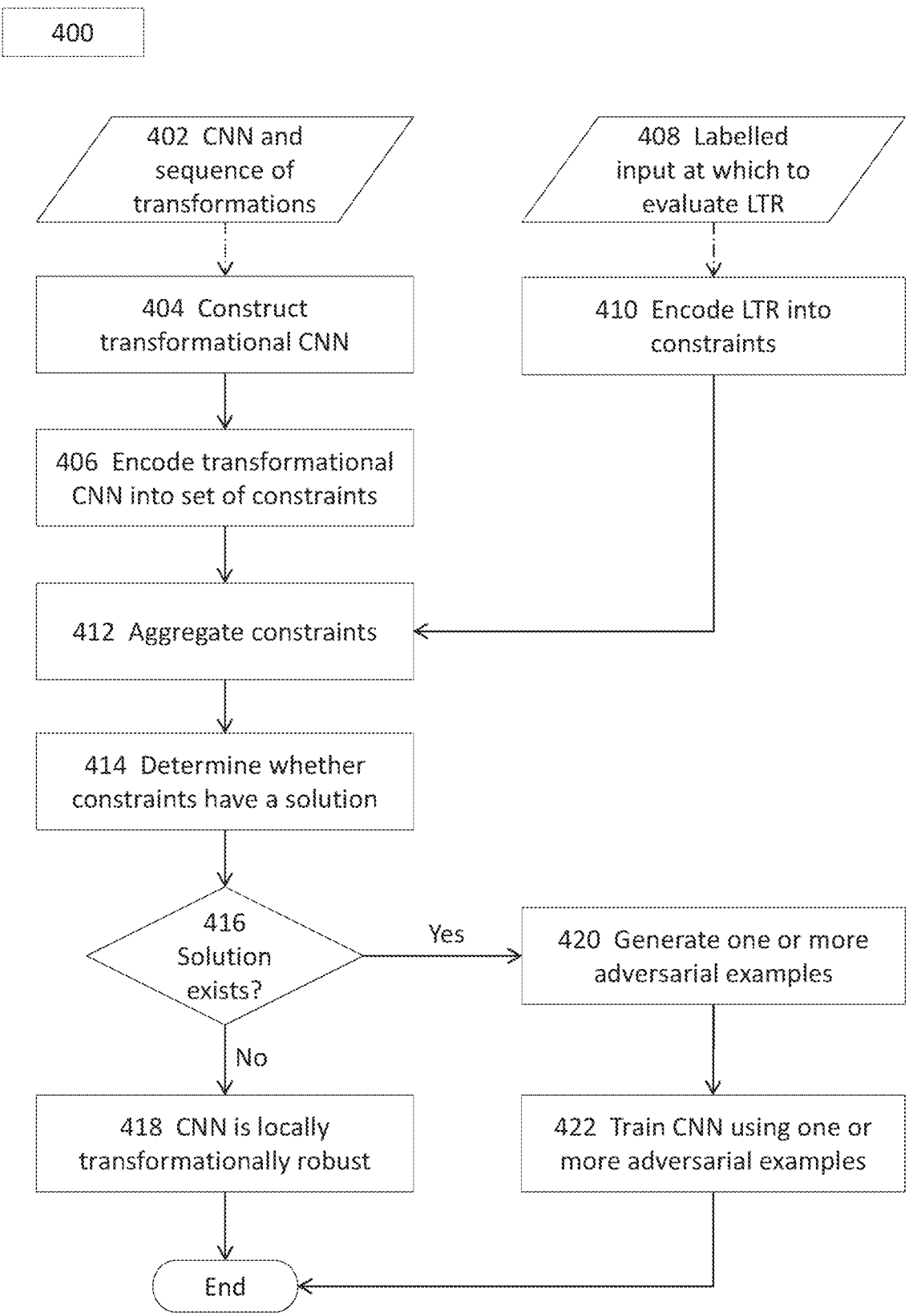
FIG. 4 shows an exemplary process for formally verifying the robustness of a trained convolutional neural network to transformations of its input implemented by the system of FIG. 1.

Turning to FIG. 4, an example method 400 is described, capable of evaluating whether a convolutional neural network is locally transformationally robust for a given transformation and an input. The method 400 comprises steps 402-422. In the present example, the CNN is an image classifier, the input is an image, and the transformation is an arbitrary combination of a translation, a scaling, and a photometric transformation.

At step 402, the processor 102 is given a trained CNN and a sequence of one or more transformations $t^{(1)}, \ldots, t^{(k)}$; the method will then proceed to evaluate the local transformational robustness of the CNN to the transformation obtained by composing the transformations $t^{(1)}, \ldots, t^{(k)}$. The CNN may be specified, for example, by its architecture and weights. The sequence of one or more transformations may be specified, for example, by their forms $t^{(1)}, \ldots, t^{(k)}$ and their domains $D^{(1)}, \ldots, D^{(k)}$. For example, the sequence of one or more transformations may be a translation, a scaling, and a photometric transformation, applied in that order, and a form and a range of parameters may be specified for each of the translation, the scaling, and the photometric transformation.

At step 404, a transformational CNN is constructed from the CNN and the sequence of one or more transformations. The transformational CNN $\overline{CNN}$ is constructed by treating the one or more transformations as additional layers and appending them to the input layer.

In some embodiments, a perturbation layer may also be added between the CNN layers and the additional layers corresponding to the one or more transformations to construct the transformational CNN. A perturbation layer is a layer that simulates a small perturbation of each pixel, up to a given constant ρ. In this way, robustness of the CNN to a combination of the transformations and of the small perturbations may be established. Since such small perturbations may commonly result from pixel interpolations occurring in image compression, transmission and encoding, verifying that the CNN is robust to such small perturbations may provide assurance that the practical deployment will function correctly despite differences in image compression, transmission and encoding setups.

Thus, the transformational CNN is constructed as $\overline{CNN}(x) = f^{n+k+2}(\ldots f^1(x) \ldots)$ where $f^{n+k+2}, \ldots, f^{k+2}$ are the original layers of the CNN, $f^{k+1}$ may optionally be a perturbation layer, and $f^{(k)}, \ldots, f^{(1)} = t^{(k)}, \ldots, t^{(1)}$.

At step 406, the transformational CNN $\overline{CNN}$ is encoded into a set of equality and inequality constraints. This is achieved by first expressing the function performed by each layer i of the transformational CNN as equality and inequality constraints $C^{(i)}$, and then aggregating the equality and inequality constraints for all the layers into a single set $C^{(\overline{CNN})} = C^{(1)} \cup \ldots \cup C^{(n)}$.

In the present example, for each layer i of the transformational CNN $\overline{CNN}$, the equality and inequality constraints $C^{(i)}$ are a mixed-integer linear problem representation (MILP representation) of the layer. A MILP representation of a function $f^{(i)}$ is a set $C^{(i)}$ of linear equality and inequality constraints on real-valued and integer variables that completely characterises the function $f^{(i)}$. All transformations and layer types considered in the present example—translation, scaling, photometric transformation, fully-connected layers with a ReLU activation function, and convolutional layers with a ReLU activation function and max-pooling—have a MILP representation. It will be evident to the person skilled in the art that a layer may alternatively be characterised by a set of linear equality and inequality constraints $C^{(i)}$ which is not a MILP representation of the layer, or even as a set of equality and inequality constraints $C^{(i)}$ which are not necessarily linear.

Where the equality and inequality constraints are linear, this has the advantage that very efficient dedicated solvers for linear equality and inequality constraints may be leveraged to determine local transformational robustness, such as MILP, SAT, CSP or SMT solvers. However, it is not essential that the equality and inequality constraints be linear, since there also exist very efficient dedicated solvers for problems that involve a mix of linear and non-linear equality and inequality constraints, such as quadratic programming and convex programming solvers.

In the following, the MILP representations of a translation, a scaling, a photometric transformation, a fully-connected layer with a ReLU activation function, and a convolutional layer with a ReLU activation function and max-pooling, are described.

The MILP representation of a photometric transformation is described as follows. A photometric transformation has two degrees of freedom: the factor μ that handles the contrast of the image, and the factor v which controls the luminosity of the image. The instantiations of the photometric transformation—that is, the possible values for the degrees of freedom of the transformation—may then be expressed by the following linear constraints:

$$\lambda_d \geq \min_d(D^{(i)}) \text{ and } \lambda_d \max_d(D^{(i)}) \text{ and } D \in \text{dof}(t^{(i)}) \quad (C1)$$

where each $\lambda_d$ is a newly-introduced variable controlling the values of the factor d, and $\min_d(D^{(i)})$ ($\max_d(D^{(i)})$, respectively) denotes the minimum (maximum, respectively) value for the factor d in $D^{(i)}$.

The photometric transformation itself for each pixel px is encoded in the following constraint:

$$t_{[px]}^i(\bar{x}^{(i-1)}) = \mu \cdot \bar{x}_{px}^{(i-1)} + v \quad (C2)$$

Given this, a photometric transformation $t^{(i)}$ may thus be described by its MILP representation $C^{(i)} = C_1 \cup C_2$.

The MILP representation of an affine transformation is now described. For any affine transformation, a set of constraints of the form C1 is used, capturing the set of instantiations of the affine transformation. Also, for every instantiation d, a binary variable $\delta_d^{(i)}$ is introduced. The variable represents whether the corresponding instantiation is the one being applied. The fact that exactly one instantiation is in use at any one time is imposed using the constraint $$\Sigma_{d \in D^{(i)}} \delta_d^{(i)} = 1 \quad (C3)$$

A bijection is also forced between the set of δ variables and the instantiations they represent by assuming:

$$\Sigma_{d \in D^{(i)}} d_j \cdot \delta_d^{(i)} = \lambda_j \text{ for each d.o.f. in } t^{(i)} \qquad (C_4)$$

So $\delta_d^{(i)} = 1$ if, for each d.o.f. j, the LP variable $\lambda_j$ representing j equals $d_j$.

The MILP representations of specific affine transformations, namely translation, subsampling, and zooming, are now described.

First, the MILP representation of a translation is described. A translation shifts the location of every pixel as per the translation vector (u', v'):

$$t_{u,v,r}^i(\bar{x}^{(i-1)}) = \sum_{(u',v') \in D^{(i)}} \bar{x}_{u+u',v+v'}^{(i-1)} \cdot \delta_{u',v'}^{(i)} \qquad (C_5)$$

Therefore, a translation $t^{(i)}$ is described by its MILP representation $C^{(i)} = C_1 \cup C_3 \cup C_5 \cup C_5$.

Second, the MILP representation of a subsampling is described. A subsampling collapses neighbourhoods of points to a point whose value is a statistic approximation of the neighbourhood. In the present example, the statistic approximation used is the arithmetic mean value. The size of the neighbourhood is controlled by the scaling factor d. This requirement is expressed as the following linear equality constraint:

$$t_{u,v,r}^i(\bar{x}^{(i-1)}) = \Sigma_{d \in D^{(i)}} AM(\bar{x}|[(u-1)d, u \cdot d],[(v-1)d, v \cdot d], r^{(i-1)}) \cdot \delta_d^{(i)} \qquad (C_6)$$

It follows that a subsampling $t^{(i)}$ is described by its MILP representation $C^{(i)} = C_1 \cup C_3 \cup C_4 \cup C_6$.

Third, the MILP representation of a zooming is described. A zooming replicates the value of a pixel to a rectangular neighbourhood of pixels. The value of the neighbourhood is controlled by the scaling factor d.

$$t_{u,v,r}^i(\bar{x}^{(i-1)}) = \sum_{d \in D^{(i)}} \bar{x}_{[\frac{u}{d}],[\frac{v}{d}],r}^{(i-1)} \cdot \delta_d^w \qquad (C_7)$$

Therefore, a zooming $t^{(i)}$ is described by its MILP representation $C^{(i)} = C_1 \cup C_3 \cup C_4 \cup C_7$. For the case of an arbitrary combination of a translation, a scaling, a shear, and a rotation, an alternative description of step 406 is given which uses non-linear constraints. In the present example, the composition of the transformations has a Mixed Integer Non-Linear Programming (MINLP) representation. MINLP allows for the description of the inverse of the matrix of the composition of the geometric transformations. Therefore, MINLP allows for the description of the composition of the geometric transformations with interpolation. Interpolation enables the discrete pixel representation of the application of the transformations to a given image. The present example composes nearest-neighbour interpolation with the transformations. It will be evident to the person skilled in the art that alternative interpolation methods can also be used, such as bi-linear interpolation.

In the following, the MINLP representation of the composition of the transformations with nearest-neighbour interpolation is described. To enable the representation, shears are restricted along the x- or y-axis and rotations are linearly approximated. For a sequence of one or more transformations $t^{(1)}, \ldots, t^{(k)}$ with domains $D^{(1)}, \ldots, D^{(k)}$, the representation is a set of MINLP constraints expressing the composition of $t^{(1)}, \ldots, t^{(k)}$ with nearest-neighbour interpolation. This is achieved in three steps. The first step inverts the matrix of the composition of the geometric transformations. For each pixel p' of the transformed image, the inverted matrix is used to determine the pixel $(M_1 \ldots M_k)^{-1} p'$ from the original image from which p' should obtain its value (where each $M_i$ is the matrix of transformation $t^{(i)}$). The second step identifies the nearest pixel from the input image to $(M_1 \ldots M_k)^{-1} p'$. The third step assigns the value of the nearest pixel from step 2 to p'.

The MINLP representation of the first step is described as follows. The step constructs a set of constraints representing the inverted matrix of the composition of the transformations. The constraints are defined by the following:

$$\{\lambda_d^{(i)} \geq \min_d(D^{(i)}, I_d^{(i)} \leq \max_d(D^{(i)} \mid i \in [k], d \in dof(D^{(i)})\} \qquad (C_1')$$

$$I_1 = M_k^{-1}, I_2 = M_{k-1}^{-1} I_1, \ldots, I_k = M_1^{-1} I_{k-1} \qquad (C_2')$$

where each $\lambda_d^{(i)}$ is an MINLP variable expressing the possible instantiations of factor dof the transformation $t^{(i)}$, and $I_1, I_2, \ldots, I_k$ are matrices of MINLP variables expressing $M_k^{-1}$, $M_k^{-1} M_{k-1}^{-1}$, $M_k^{-1} M_{k-1}^{-1} \ldots M_1^{-1}$ respectively. The value of the variables $I_1, I_2, \ldots, I_k$ is non-linearly derived in $C_2'$, therefore the $C_2'$ constraints are not expressible in MILP.

The MINLP representation of the second step is described as follows. The step extends the MINLP program constructed by the first step to encode the nearest neighbour of $(M_1 \ldots M_k)^{-1} p'$. To do this, it first builds a set of MINLP constraints representing the distance between $(M_1 \ldots M_k)^{-1} p'$ and each of the points of the input image as measured by the $L_1$ norm. The constraints it generates are given by the following:

$$\text{Dist}(l_k \cdot p', p) = \|l_k \cdot p' - p\|_1, \text{ for each pixel } p \qquad (C_3')$$

The $L_1$ norm is a piecewise-linear function and can therefore be encoded in MINLP by means of the big-M method. Following the construction of $C_3'$, the second step builds a set of constraints to identify the point p such that $\|l_k \cdot p' - p\|_1$ is minimum. This is expressed by the following:

$$\text{mindist} = \min(\text{Dist}(l_k \cdot p', p)), \text{ for each pixel } p \qquad (C_4)$$

The minimum function is a piecewise-linear function and can thus be expressed in MINLP by using the big-M method.

The MINLP representation of the third is described as follows. The step takes as input the constraints from the second step and the image under question. It then constructs a set of constraints that encode the assignment of the value of the nearest neighbour of $l_k \cdot p'$ to p'. The constraints are defined as follows:

$$\delta_p = 1 \Longrightarrow \text{Dist}(l_k \cdot p', p) = \text{mindist}, \text{ for each pixel } p \qquad (C_5')$$

$$\sum_p \delta_p = 1 \qquad (C_6')$$

$$\text{val}(p') = \sum_p \text{val}(p) \delta_p \qquad (C_7')$$

The above constraints use a binary variable $\delta_p$ per pixel p. It is required by ($C_5'$) that if a variable is equal to 1, then the pixel associated with the variable is the nearest neighbour to $l_k \cdot p'$. The implication constraints in ($C_5'$) are expressible in MILNP through the big-M method. The constraint ($C_6'$) insists on exactly one of the binary variables to equal 1. Therefore, by ($C_7'$), p' is assigned the value of the nearest neighbour of $l_k \cdot p'$.

Therefore, the composition of $t^{(1)}, \ldots, t^{(k)}$ is alternatively described by its MINLP representation $C_1' \cup \ldots \cup C_7'$. Differently from the MILP representation, the MINLP representation composes $t^{(1)}, \ldots, t^{(k)}$ with interpolation.

The MILP representation of a perturbation layer $f^{(i)}$ is given as follows. For each pixel px, the variation of the pixel between the input to the perturbation layer must be less than ρ in magnitude. Therefore, the perturbation layer may be expressed by two constraints for each pixel px:

$$\overline{x}_{px}^{(i+1)} - \overline{x}_{px}^{(i)} \leq \rho \tag{C8}$$

$$\overline{x}_{px}^{(i+1)} - \overline{x}_{px}^{(i)} \leq -\rho \tag{C9}$$

A perturbation layer $f^{(i)}$ is thus described by its MILP representation $C^{(i)} = C_8 \cup C_9$.

The MILP representation of a fully-connected layer is now described. The weighted sum function is encoded as the following constraint:

$$WS(\overline{x}^{(i-1)})_j = W_j^{(i)} \cdot \overline{x}_j^{(i-1)} + \overline{b}_j^{(i)} \tag{C10}$$

To capture the piecewise-linearity of the ReLU function, a binary variable $\delta_j^{(i)}$ is introduced for each node j that represents whether the output of the node is above 0. The ReLU may therefore be expressed as the following inequality constraints:

$$ReLU(\overline{x}^{(i-1)})_j \geq 0 \tag{C11}$$

$$ReLU(\overline{x}^{(i-1)})_j \geq WS(\overline{x}^{(i-1)})_j \tag{C12}$$

$$ReLU(\overline{x}^{(i-1)})_j WS(\overline{x}^{(i-1)})_j + M\delta_j^{(i)} \tag{C13}$$

$$ReLU(\overline{x}^{(i-1)})_j \leq M(1 - \delta_j^{(i)}) \tag{C14}$$

In the above inequalities, M denotes a sufficiently large number.

Therefore, a fully connected layer $f^{(i)}$ is described by its MILP representation $C^{(i)} = C_{10} \cup \ldots \cup C_{14}$.

The MILP representation of a convolutional layer is as follows. In addition to the ReLU phase, a convolutional layer includes a convolution and a max-pooling phase. Similarly to the weighted-sum function, a convolution is a linear operation on the input of the layer and can be encoded by the following:

$$Conv_{u,v}^{(i),j} = K_j^{(i)} \cdot \overline{x}_{[u,u'],[v,v'],[z_5^{(i-1)}]}^{(i-1)} + \overline{b}_j^{(i)} \text{ where } u' = u + p - 1, \tag{C15}$$

$$v' = v + q - 1$$

A max-pooling function is parameterised over the size of the groups of pixels over which the max-pooling is performed. Previous linear encodings of the function use a binary variable per node in a group; here, an encoding is provided that uses logarithmically less variables. Specifically, to select the maximum value from a group, a sequence of binary variables is introduced. The number in base-2 represented by the binary sequence expresses the node in a group whose value is maximum. Since the size of the group is p·q, $\lceil \log_2(p \cdot q) \rceil$ binary variables are needed to represent the node whose value is maximum. To facilitate the presentation of the corresponding linear constraints, we write n for the binary representation of $n \in Z$. We denote by $|n|$ the number of binary digits in n. Given $j \in |n|$ expresses the j-th digit in n whereby the first digit is the least significant bit. If $j > |n|$, then we assume that $n_j = 0$. The linear representation of the max-pooling function for a pixel $px = (px_\alpha, px_\beta, px_\gamma)$ and pool size pxq is given by the following.

$$Pool_{px}^{(i)} \geq Conv_{(px_\alpha - 1)p + u', (px_\beta - 1)q + v', px_\gamma} u' \in [p], v' \in [v] \tag{C16}$$

$$Pool_{px}^{(i)} \geq Conv_{(px_\alpha - 1)p + u', (px_\beta - 1)q + v', px_\gamma} + M\Sigma_{j \in [p,1]} \overline{z}_j + (1 - 2z_j)\delta_{px,j}^{(i)}, u' \in [p], v' \in [v], z = (u'-1)q + v'-1 \tag{C17}$$

Where $\delta_{px,1}^{(i)}, \ldots, \delta_{\lceil log_2(px,p \cdot q) \rceil}^{(i)}$ are the binary variables associated with px. For the case where p·q is not a power of 2, it is required that the number represented by $\delta_{px,1}^{(i)}, \ldots, \delta_{\lceil log_2(px,p \cdot q) \rceil}^{(i)}$ lie within 0, … (p·q−1), which is formally expressed through the following constraint:

$$\Sigma_{j \in [p,q]} z_j + (1 - 2z_j)\delta_{px,j}^{(i)} \geq 1, z \in [p \cdot q, 2^{\lceil p \cdot q \rceil} - 1] \tag{C18}$$

Thus, a convolutional layer $f^{(i)}$ is described by its MILP representation $C^{(i)} = C_{15} \cup \ldots \cup C_{18}$.

Given the above, the set of constraints describing a transformational CNN $\overline{CNN}(x) = f^{(n)}(f^{(n-1)}(\ldots f^{(-1)}(x) \ldots))$, is obtained as the union of the constraints characterising its layers, that is, $C^{\overline{CNN}} = C^{(1)} \cup \ldots \cup C^{(n)}$.

At step 408, the processor 102 is given a labelled input $\mathfrak{I}$ to the CNN, with label $l_\mathfrak{I}$, at which local transformational robustness to the transformation is to be evaluated. For example, this may be an input whose true class is known and at which the CNN may be expected to be robust to the transformation.

At step 410, the local transformational robustness requirement at the input is encoded into a set of equality and inequality constraints.

First, equality and inequality constraints are generated that specify that the input to the transformational CNN is set to the given labelled input $\mathfrak{I}$. In the present example, the equality constraint used is $C^\mathfrak{I} \triangleq \overline{x}^{(0)} = \mathfrak{I}$, which fixes the input of t to $\mathfrak{I}$.

Second, equality and inequality constraints are generated that specify that there is a linear activation in the output layer that is larger than the activation associated with the label $l_\mathfrak{I}$. This is achieved similarly to the encoding of the max-pooling function: a sequence of $\lceil \log_2 c \rceil$ binary variables $\delta_0^{(n)}, \ldots, \delta_{\lceil log_2 c \rceil}^{(n)}$ is introduced, where the sequence's binary number b denotes the node from the output layer that is associated with class $b+1 \in [c]$ and whose linear activation is larger than the linear activation of the node associated with $l_\mathfrak{I}$. The constraint is then expressed as $$WS(\overline{x}^{(i-1)})_{l_m} \leq \tag{C19}$$

$$WS(\overline{x}^{(i-1)})_j + M \sum_{k \in |c|} (j_k + (1 - 2j_k)\delta_k^{(n)}, j \in [0, c-1]\backslash(l_\mathfrak{I} - 1)$$

Moreover, the variables $\delta_0^{(n)}, \ldots, \delta_{\lceil log_2 c \rceil}^{(n)}$ are prevented from representing $l_\mathfrak{I}$ or any number greater than c−1 using the following constraint:

$$\Sigma_{k \in |c|} (j_k + (1-2j_k)\delta_j^{(n)} \geq 1, j \in \{l_\mathfrak{I} - 1\} \cup [c, 2^{|c|} - 1] \tag{C20}$$

The requirement of local robustness is thus described by the linear inequality constraints $C^{(lrob)} = C_{19} \cup C_{20}$.

At step 412, all the constraints obtained at step 306 and 310 are aggregated into a set of constraints $C^{(all)} = C^{(\mathfrak{I})} + C^{(\overline{CNN})} + C^{(lrob)}$. Recall that the constraints $C^{(\mathfrak{I})}$ specify that the input to the CNN is the given labelled input image, the constraints $C^{(\overline{CNN})}$ specify the CNN and the transformation over its domain, and the constraints $C^{(lrob)}$ specify that there is a linear activation in the output layer that is larger than the activation associated with the label of the labelled input. Therefore, if a solution to the set of constraints $C^{(all)}$ exists, the CNN is not locally transformationally robust to the transformation at the labelled image. Conversely, if the set of constraints does not admit a solution, the CNN is locally transformationally robust. This is proven in the following theorem:

Theorem 1: Let CNN be a CNN, t a transformation with domain D, and $\Im$ an image. Let LP be the linear problem defined on objective function obj=0 and set of constraints $C^{(\Im)}+C^{(\overline{CNN})}+C^{(lrob)}$, where $C^{\Im} \triangleq \overline{x}^{(0)}=\Im$ fixes the input of t to $\Im$. Then CNN is locally transformationally robust for t and $\Im$ if LP has no solution.

Proof: Let $\overline{CNN}=f^{(n+1)}(\ldots f^{(1)}(\Im)\ldots)$. For the left to right direction assume that LP has a feasible solution. Consider $d=(\lambda_j: j \in \text{dof}(t))$, where each $\lambda_j$ is the value of the d.o.f. $d_j$ of t in the solution. By the definition of LP we have that $CNN(t[d]\Im)=\text{Argmax}(\overline{x}^{(n+1)})$. By the definition of $C^{(lrob)}$ there is l with $l \neq l_{\Im}$ and $$\overline{x}_l^{(n+1)} \geq \overline{x}_{l_x}^{(n+1)}.$$

Therefore $CNN(t[d]\Im) \neq l_{\Im}$, and therefore CNN is not locally transformationally robust. For the right to left direction suppose that CNN is not locally transformationally robust. It follows that there is $d \in D$ such that $CNN(t[d]\Im) \neq l_{\Im}$. Then, the assignment $\lambda_j=d$, for each d.o.f j of t and $\overline{x}_j^{(i)}=f^{(n+l)}(\ldots f^{(1)}(\Im)\ldots)$ is a feasible solution for LP.

At step 414, the processor 102 determines whether the constraints $C^{(all)}$ admit a solution. This may be done using any suitable optimisation solver, such as a simplex-method or interior-point solver in the case of linear constraints, or a convex optimisation solver if appropriate.

In the present example, each constraint of $C^{(all)}$ is a linear equality or inequality constraint on real-valued and integer variables. A set of constraints where each constraint is a linear equality or inequality constraint on real-valued and integer variables is said to be a mixed-integer linear problem (MILP); in the present example, $C^{(all)}$ is thus a mixed-integer linear problem (MILP). There exist dedicated programs that are able to ascertain whether a MILP admits a solution, and return such a solution if it exists. For example, the Gurobi MILP solver is such a program.

In the present example step 414 is carried out by the Gurobi MILP solver determining whether the mixed-integer linear problem $C^{(all)}$ admits a solution.

If at step 416, it is found that no solution to the constraints $C^{(all)}$ exists, the method therefore determines that the CNN is locally transformationally robust at step 418. As a result, the safety of the CNN under a range of practically relevant conditions may be established.

If, on the other hand, one or more solutions are found that fulfil the constraints $C^{(all)}$, the method moves to step 420.

At step 420, one or more adversarial examples are generated from the one or more solutions that fulfil the constraints $C^{(all)}$. An adversarial example is an input obtained by transforming the labelled input using the transformation, which is classified differently than the labelled image by the CNN.

The one or more adversarial examples are generated as follows. Each of the one or more solutions describes a value for the transformation's degrees of freedom d, such that applying the transformation with the degrees of freedom set to d to the labelled image results in an image which is classified differently than the labelled image by the CNN.

Therefore, for each of the one or more solutions to the constraints $C^{(all)}$, the values of the degrees of freedom d specified in the solution may be obtained, and an adversarial example may be generated as $\Im^{(adv)}=t[d](\Im)$.

Thus, the method guarantees the generation of adversarial examples whenever they exist, in contrast to previous formal verification approaches in adversarial learning, where adversarial examples may not be identified even if these exist.

The method then advances to step 422, where the one or more adversarial examples are used as training examples to further train the CNN. As a result of training the CNN using the adversarial examples, the CNN may learn to classify the adversarial examples correctly. Consequently, the robustness of the CNN may be improved, so that the CNN may be made more suitable for a practical deployment where distortions represented by the transformation are to be expected.

Once the one or more adversarial examples have been used as training examples to further train the CNN, the method 400 may be performed repeatedly on the further trained CNN to improve the robustness of the CNN. For example, method 400 may be repeatedly performed until the CNN is shown to be locally transformationally robust.

Figure 5:
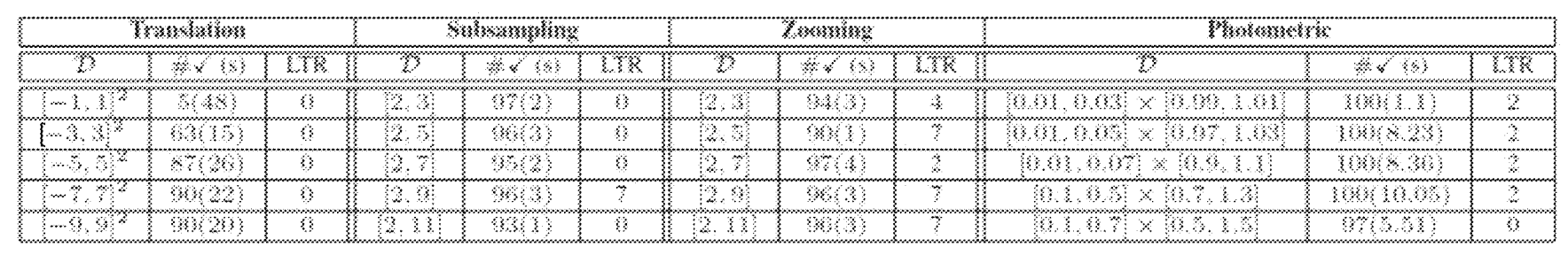

With reference to FIG. 5, experimental results are now described. Method steps 400 was implemented by a toolkit VERA that takes as input the descriptions of a CNN and a sequence of transformations against which the local transformational robustness of the CNN is meant to be assessed. Following this VERA builds the linear encoding of the verification query according to steps 402-412.

Having constructed the linear program VERA invokes the Gurobi checker to ascertain whether the program admits a solution. The satisfiability output of the latter corresponds to the violation of the local transformational robustness property of the CNN, whereas the unsatisfiability output can be used to assert the CNN is transformationally locally robust.

VERA has been tested on CNNs trained on the MNIST dataset using the deep learning toolkit Keras. Since currently there are no other methods or tools for the same problem only the results obtained with VERA are reported. In the experiments, a CCN of 1481 nodes was used, with a convolutional layer of 3 convolutions with kernels of size 15×15 and pool-size 2×2 and an output layer with 10 nodes. The accuracy of the network on the MNIST dataset is 93%. To check the network's transformational local robustness 100 images were selected for which the network outputs the correct classification label. Experiments were then performed for translation, subsampling, zooming and photometric transformations with varying domains for each of their degrees of freedom, with results summarised in FIG. 5. The experiments were run on a machine equipped with an i7-7700 processor and 16 GB of RAM and running Linux kernel version 4.15.0.

FIG. 5 reports the number of images verified under the timeout of 200 s, irrespective of whether these were shown robust, followed by the average time taken for verifying said images. This is indicated in the column #✓(s). For example, for subsampling transformations on domain [2,3], the method could verify 97 images out of 100 with an average time of 2 secs. Furthermore, the LTR column reports the number of images that were determined to be locally transformationally robust.

Note that there is some variability in the results. For example, several images could not be assessed by the timeout for the translation with domain [−1; 1] but many more could be analysed under the translation domain [−3; 3]. This is likely to be due to optimisations carried out by Gurobi which can be applied in some cases only. Indeed, note in general that an increase in the range of the domains does not lead to longer computations times, since the resulting linear program is only marginally extended.

In summary, the results show that the CNN built from the MNIST dataset is not locally transformationally robust with respect to translation, subsampling and zooming, returning different classifications even for small transformational changes to the input. The CNN appears just as fragile in terms of luminosity and contrast changes. Overall, the results show that the CNN in question is brittle with respect to transformational robustness.

Furthermore, with reference to FIG. 6, the efficacy of method 400 to improve the robustness of the CNN via data augmentation was experimentally evaluated for translation, scale, shear, rotation, brightness, and contrast. The results were then compared with results obtained from traditional data augmentation schemes. For each of the transformations, the experimental plan consisted of the following three steps.

In the first step, a transformed test set was generated by applying the transformation to each of the images of the original test set. For each of the transformed images a random instantiation of the transformation that was uniformly sampled from its domain was used. The second column of FIG. 6 records the accuracy of the CNN on the transformed test set. The CNN exhibits very poor generalisation to affine transformations and good generalisation to photometric transformations.

In the second step, twenty correctly classified images were sampled from the original training set. These were passed to VERA to generate the augmentation set. Then, the training set was enlarged with the augmentation set and the network was retrained.

In the third step, the first and second steps were performed again by using standard augmentation methods whereby random instantiations of the transformation are applied to images from the original training set.

The three steps were repeated for three iterations. For each iteration, FIG. 6 reports the size of the augmentation set w.r.t original training set (first column), and the accuracy of the resulting model and average time each augmentation method took per image (column 2 for standard augmentation and column 3 for verification-based augmentation). For example, for translation, standard augmentation achieves 64% accuracy with 0 s average time, and verification-based augmentation achieves 65% accuracy with 161 s average time.

The results show that verification-based augmentation achieves higher accuracy than standard augmentation methods.

The observed variability in the results accounts for the varying sizes of the augmentation sets in conjunction with the different accuracies exhibited by the models in each of the iterations. As the augmentation set grows and the accuracy of the classifier improves, the enlargement of the training set with counterexamples is more beneficial to the improvement of the classifier's accuracy than its enlargement with random transformations.

Variations and modifications of the specific embodiments described above will be apparent to the skilled person. For example, alternative forms of classifier neural network may be adopted as appropriate. In general, a perception classifier may classify sensor data. Similarly, while the system of FIG. 1 is illustrated in a particular form, the skilled person will recognise that alternative hardware and/or software elements may be adopted to carry out the method described in the present disclosure.

The invention claimed is:

1. A computer-implemented method for operating an actuator using a neural network image classifier having robustness verified with respect to one or more parameterized transformations applied to an input image, the classifier comprising one or more convolutional layers, the method comprising:
encoding each layer of the image classifier as one or more algebraic classifier constraints, wherein the image classifier is configured to receive the input image and output a classifier label;
encoding each parameterized transformation as one or more algebraic transformation constraints, the parametrized transformations including at least one of translation, rotation scaling, shear, brightness and/or contrast;
encoding a change in an output classifier label from the image classifier as an algebraic output constraint;
determining whether a solution exists which satisfies the classifier constraints, transformation constraints and output constraints, and determining the classifier as robust to the parameterized transformations if no such solution exists such that the image classifier always returns the same classifier label for an image of a given scene regardless of the application of the one or more parameterized transformations;
the method further comprising, where a solution exists which satisfies the classifier constraints, transformation constraints and output constraints:
identifying parameters of the one or more transformations associated with the solution;
generating additional training data by applying the one or more transformations to existing training data using the identified parameters;
and training the classifier using the additional training data and
the method further comprises:
operating the classifier to classify image data obtained from a camera,
generating a control signal in dependence on an output of the classifier, and
operating an actuator in accordance with the control signal.

2. The computer-implemented method according to claim 1, wherein one or more of the classifier, transformation and output constraints are linear constraints.

3. The computer-implemented method according to claim 1, wherein one or more of the classifier, transformation and output constraints are non-linear constraints.

4. The computer-implemented method according to claim 1, wherein the classifier further comprises one or more fully connected layers.

5. The computer-implemented method according to claim 1, wherein encoding each layer of the classifier as one or more algebraic classifier constraints comprises deriving a mixed-integer linear programming expression for each layer.

6. The computer-implemented method according to claim 1, wherein encoding each transformation as one or more algebraic transformation constraints comprises deriving a mixed-integer linear programming expression for each layer.

7. The computer-implemented method according to claim 1, wherein encoding each transformation as one or more algebraic transformation constraints comprises deriving a mixed-integer non-linear programming expression for each layer.

8. The computer-implemented method according to claim 1, wherein one or more of the classifier layers comprises a rectified linear unit activating function.

9. A perception system comprising a neural network image classifier implemented on one or more processors configured to carry out a method for verifying the robustness of the neural network image classifier with respect to one or more parameterized transformations applied to an input image, the classifier including one or more convolutional layers, the method including:
- encoding each layer of the image classifier as one or more algebraic classifier constraints, wherein the image classifier is configured to receive the input image and output a classifier label;
- encoding each parameterized transformation as one or more algebraic transformation constraints, the parametrized transformations including at least one of translation, rotation scaling, shear, brightness and/or contrast;
- encoding a change in an output classifier label from the image classifier as an algebraic output constraint;
- determining whether a solution exists which satisfies the classifier constraints, transformation constraints and output constraints, and determining the classifier as robust to the parameterized transformations if no such solution exists such that the image classifier always returns the same classifier label for an image of a given scene regardless of the application of the one or more parameterized transformations;
- the method further comprising, where a solution exists which satisfies the classifier constraints, transformation constraints and output constraints:
- identifying parameters of the one or more transformations associated with the solution;
- generating additional training data by applying the one or more transformations to existing training data using the identified parameters;
- and training the classifier using the additional training data,
- wherein the perception system further comprises a controller and an actuator, the classifier is configured to classify image data received from a camera, the controller is configured to generate a control signal in dependence on an output of the classifier, and the actuator is configured to operate in accordance with the control signal received from the controller.

* * * * *